US 6,599,426 B2

(12) United States Patent
Drie

(10) Patent No.: US 6,599,426 B2
(45) Date of Patent: Jul. 29, 2003

(54) HIGH DISSOLVED OXYGEN MIXER-DIGESTER METHOD

(76) Inventor: Gerhardt Van Drie, 724 W. Pine Ave., El Segundo, CA (US) 90245

( * ) Notice: Subject to any disclaimer, the term of this patent is extended or adjusted under 35 U.S.C. 154(b) by 2 days.

(21) Appl. No.: 10/183,228

(22) Filed: Jun. 26, 2002

(65) Prior Publication Data

US 2002/0158013 A1 Oct. 31, 2002

Related U.S. Application Data

(62) Division of application No. 09/798,230, filed on Mar. 2, 2001.
(60) Provisional application No. 60/187,627, filed on Mar. 8, 2000.

(51) Int. Cl.⁷ ................................................. C02F 3/00
(52) U.S. Cl. ...................... 210/629; 210/620; 210/220
(58) Field of Search ............................. 210/620, 629, 210/220

(56) References Cited

U.S. PATENT DOCUMENTS

| | | | |
|---|---|---|---|
| 2,784,150 A | 3/1957 | Rose et al. | |
| 3,773,015 A | 11/1973 | Cruickshank et al. | |
| 3,788,616 A | 1/1974 | Clough, Jr. | |
| 3,997,437 A | * 12/1976 | Prince et al. | ............... 210/623 |
| 4,215,082 A | * 7/1980 | Danel | ......................... 261/124 |
| 4,363,212 A | 12/1982 | Everett | |
| 4,555,335 A | * 11/1985 | Burris | ........................ 210/192 |
| 4,595,296 A | 6/1986 | Parks | |
| 4,650,577 A | * 3/1987 | Hansel | ..................... 210/195.3 |
| 4,737,036 A | 4/1988 | Offermann | |
| 4,779,990 A | 10/1988 | Hjort et al. | |
| 4,919,849 A | 4/1990 | Litz et al. | |
| 5,075,048 A | * 12/1991 | Veeder | ..................... 261/122.1 |
| 5,156,788 A | 10/1992 | Chesterfield et al. | |
| 5,198,156 A | 3/1993 | Middleton et al. | |
| 5,397,001 A | * 3/1995 | Yoon et al. | .................. 209/170 |
| 5,676,823 A | * 10/1997 | McKay et al. | .............. 209/170 |
| 6,036,357 A | * 3/2000 | Van Drie | |

FOREIGN PATENT DOCUMENTS

SU 1400651 9/1986

* cited by examiner

Primary Examiner—Chester T. Barry
(74) Attorney, Agent, or Firm—Gene Scott-Patent Law & Venture Group

(57) ABSTRACT

A sludge digesting method uses a mixing tank providing an integral ceiling, interior wall surface and a floor surface. A vertical beam supports a mixing device engaged for movement along the vertical beam. A plurality of sparger jets protrudes from the wall surface for delivering an oxygen gas flow directly into the interior of the sludge. A second plurality of sparger jets terminates at the mixing tank floor surface for delivering oxygen gas into the mixing tank and a plurality of bubbling diffusers in a circle ⅔ of the diameter of the tank protrudes upwardly from the floor surface for delivering further oxygen gas flow into the mixing tank. The method provides for mixing and entraining oxygen into a process sludge, in an amount of between 4–45 ppm, to accelerate digestion as a batch or continuous process.

4 Claims, 1 Drawing Sheet

HIGH DISSOLVED OXYGEN MIXER-DIGESTER METHOD

RELATED APPLICATIONS

The present application, being a divisional of Ser. No. 09/798,230 with an official filing date of Mar. 2, 2001 and which is presently co-pending, now allowed, claims the non-elected claims thereof, and the priority date of a prior filed provisional patent application having a Ser. No. 60/187,627, and an official filing date of Mar. 8, 2000, and which was claimed by the parent application and which discloses identical subject matter as described herein.

BACKGROUND OF THE INVENTION

1. Field of the Invention

This invention relates generally to large-scale water treatment mixing method and more particularly to such a method wherein the fluids being treated are forced to dissolve the highest possible level of oxygen possible.

2. Description of Related Art

The following art defines the present state of this field:

Rose et al., U.S. Pat. No. 2,784,150 describes a vacuum still capable of equilibrium evaporation with no bumping comprising a still pot having two necks, one of said necks being connected to a longitudinally extended tube closed at its far end, the second of said necks being connected to condensing means; the first of said necks and its attached tube having extending therein an agitator comprising an elongated shaft having disposed along its midsection in a spaced relationship a plurality of inverted cup-shaped baffles, each baffle having a plurality of perforation spacedly disposed over its surface, said shaft passing through the center of, and being rigidly attached to, each baffle, said shaft further having attached to its lower end an open-spiral elastic spring and to its upper end a totally enclosed chamber containing a soft iron core; the aforementioned tube attached to the first neck being surrounded near its upper end by a solenoid capable of imparting a vertically reciprocating motion to the enclosed agitator when said solenoid is cyclically activated and deactivated by passage of electric current therethrough.

Clough, Jr., U.S. Pat. No. 3,788,616, teaches a "system for simultaneously aerating and agitating a body of liquid. The system comprises a body that is pivotally mounted in the liquid with its pivot point located intermediate its ends, and means for feeding air to the lower side of the body. The body is adapted to trap alternately at each end sufficient air to cause that end to rise in the liquid, and means are provided for releasing the air trapped at each end of the body when that end has risen a predetermined amount, with the result that the body oscillates on its pivot axis in see-saw fashion".

Cruickshank et al., U.S. Pat. No. 3,773,015 describes valve arrangement used to control the release of air from the helmet of a miniature diver so as to cause the diver to periodically dive and ascend within an aquarium tank. The cycle period can be varied by controlling the rate at which air is supplied from a conventional aquarium air source. The diver is slidably mounted on a hollow tube for movement between first and second stations. At the first station, the tube has an opening to admit air to the interior of the diver to increase its buoyancy. The admitted air is retained in the diver until it reaches the second station. The tube has a necked down portion at the second station to release the air contained within the diver.

Everett, U.S. Pat. No. 4,363,212, teaches a "buoyancy prime mover that converts the potential energy of a gas buoyant within a liquid into rotating mechanical energy comprises a plurality of rigid or collapsible buckets joined by one or more chains with rotatable sprockets and shafts to form a continuous loop so that when the buoyant gas is trapped within the buckets, the buckets rise through the liquid and rotate the chain and sprockets to generate power".

Parks, U.S. Pat. No. 4,595,296, teaches an invention which "relates to a mixing and blending system in which pulsed air or gas bubbles of predetermined variable size and frequency are injected into a tank containing materials to be agitated or stirred for mixing or blending. The air introduced at the bottom of the tank through an air inlet opening. There may be more than one air inlet and the inlets may be provided with accumulator plates depending upon diameter and height of the tank in which the mixing and blending is taking place. The inlets are located so as to create circular torroidal flow of fluid in a generally vertical plane. The accumulator plate has the purpose of assisting the formation of essentially a single bubble from the compressed air charge made to the air inlet and increasing the time required for the bubble to rise through the liquid by causing it to be formed more quickly and closer to the bottom of the tank. Hence, the accumulator plate is utilized in low viscosity liquids such as water".

Offermann, U.S. Pat. No. 4,737,036 describes a device for shipping cream or egg whites having a cup-shaped cylindrical housing with a performed bottom, a cap releasably locking the open top, a perforated plunger piston connected to one end of the piston rod and movable within the housing, the piston rod being movable through the cap and formed with a handle at its opposite end, one of two perforated plates spaced from the plunger piston on the piston rod. The perforated disc is biased by a spiral coil spring from the plunger and may be further biased from a second perforated disc. When the discs and plunger are compressed together, any product between them is squeezed out through their holes.

Hjort, et al, U.S. Pat. No. 4,779,990, teaches an "impeller apparatus for dispersing a gas into a liquid in a vessel includes a centrifugal flow turbine, the blades of which are formed with a substantially streamlined trailing surface terminated by a sharply pronounced spine. The blade is formed by a plate-like initial blank being cut to a shape having a central line of symmetry, the blank then being folded along the straight line of symmetry.

Litz, et al, U.S. Pat. No. 4,919,849, teaches a "gas-liquid mixing process and apparatus having a vessel with an axial flow down-pumping impeller in a draft tube has gas ingestion tubes extending into a body of liquid from a hollow portion of the impeller shaft or other fluid communication means with the overhead gas in the vessel. Upon gas-liquid mixing at liquid levels that interfere with vortex development by the impeller, gas is drawn from the overhead through the ingestion tubes into the body of liquid".

Small, U.S. Pat. No. 5,156,788, teaches a "device for use in the mixing of fluids, e.g. the gasification of liquids, comprises an elongate member including an internal passage; and, mounted on the elongate member via radial arms, one or more venturi members each having a convergent-divergent duct whose axis is substantially tangential to the elongate member, and in which the neck of the duct has an opening in communication, via passages in the radial, with the internal passage. On rotation of the device, reduced pressure in the duct neck draws fluid down the shaft of the elongate member".

Middleton, et al, U.S. Pat. No. 5,198,156, teaches a turbine agitator assembly including a reservoir for liquid, a rotor mounted in the reservoir and with a plurality of radially extending blades, and sparger means for introducing a fluid into liquid in the reservoir. The fluid sparger means and the rotor are so constructed and arranged that, in use, the rotor blades (submerged in the liquid) and/or the liquid flow they generate disperse the sparged fluid. Each of the blades is hollow and has a discontinuous leading edge, only a single trailing edge along an acute angle, no external concave surface and an open radially outer end.

Stavropol Agric Ins, SU 1400651 describes a mixer comprising a cavity with a conical bottom equipped with a heater and mixing device. The latter is made in the form of a bell positioned in the cavity. The bell is equipped in the upper part with a by-pass valve, connected to the rod, whose length is greater than the bell height by a distance equal to total of the cone bottom height and valve slide valve run. A rigid net partition, separating the cavity from the gas carrier, is attached to the cavity cover. The bell floats up due to the buoyancy force, which occurs when the biogas accumulates under it. The valve strikes the partition and opens. When the biogas leaves from under the bell, it drowns and valve closes with the help of rod. Mixer is used for mixing liquid media applied in aerobic fermentation of livestock farming wastes. Its structure is simplified and power losses are decreased. The prior art teaches the use of mixers similar in concept and construction to the present invention, but the prior art does not teach how to achieve the goals of the present invention. The present invention fulfills these needs and provides further related advantages as described in the following summary.

SUMMARY OF THE INVENTION

The present invention teaches certain benefits in construction and use, which give rise to the objectives described below.

Only three percent of the Earth's water is potable. This small fraction has been dwindling over the course of recorded history due to natural and man-made effects. As human populations grow, a continuing problem worsens; the ability to obtain sufficient quantities of potable water for human use. The invention described herein is a partial solution to this problem. Sewage treatment is the primary means by which pollution of rivers, streams and lakes is prevented. Improvements in this area of industry are critical to the larger problem of providing fresh water supplies to the world's population.

Gaseous oxygen has been used in activated sludge processing and aerobic digester sludge treatment facilities and processes. Common practice consists of maintaining dissolved oxygen quantities in the liquid media from zero to two parts per million by weight. The present invention uses a mixing method and use of oxygen, which enables the processing a significantly higher percent of sludge solids, by weight, than has been heretofore possible. Aerobic bacteria of various species are the means of processing sludge in digester tanks. The present invention uses a combination of improved mixing and a high dissolved oxygen content; between four and forty-five parts per million, to support a larger population density of aerobic bacteria for improved sludge processing in digester tanks. Such improvements relate to processing speed and quality as well. The apparatus uses bubbling diffusers populated in the tank bottom and sparger jets protruding from the walls of the tank. Both of these provide oxygen gas flows into the tank. The mass flow of this gas produces turbulence in the media providing high level contact between gas and liquid to maximize surface contact area. The present invention, a sludge digester, comprises a mixing tank providing an integral ceiling, interior wall surface and a floor surface. A vertical beam supports a mixing device engaged for movement along the vertical beam. A plurality of sparger jets protrudes from the wall surface for delivering an oxygen gas flow directly into the interior of the sludge. A second plurality of sparger jets terminates at the mixing tank floor surface for delivering oxygen gas into the mixing tank and a plurality of bubbling diffusers protrudes upwardly from the floor surface and arranged at a critical diameter for delivering further oxygen gas flow into the mixing tank in a batch or continuous process.

A primary objective of the present invention is to provide a method of use that provides advantages not taught by the prior art. The invention uses high volume oxygen gas delivery and mechanical mixing to achieve significant improvements in the art.

Another objective is to provide such an invention capable of entraining gas into a process liquid at a very high rate.

A further objective is to provide such an invention capable of high rate mixing through gas injection turbulence.

A further objective is to provide such an invention capable of reducing harmful bacteria in downstream effluent to near zero.

A further objective is to provide such an invention capable of reducing sludge solids by up to 70% relative to conventional processing.

A further objective is to provide such an invention capable of improvements in sludge settling by up to 100%.

A further objective is to provide such an invention capable of high rate mixing through gas injection turbulence.

A still further objective is to provide a process method that is able to be completed as a continuous process within a field of industry where heretofore, such processing has been limited to batch process methods.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

Figure 1:
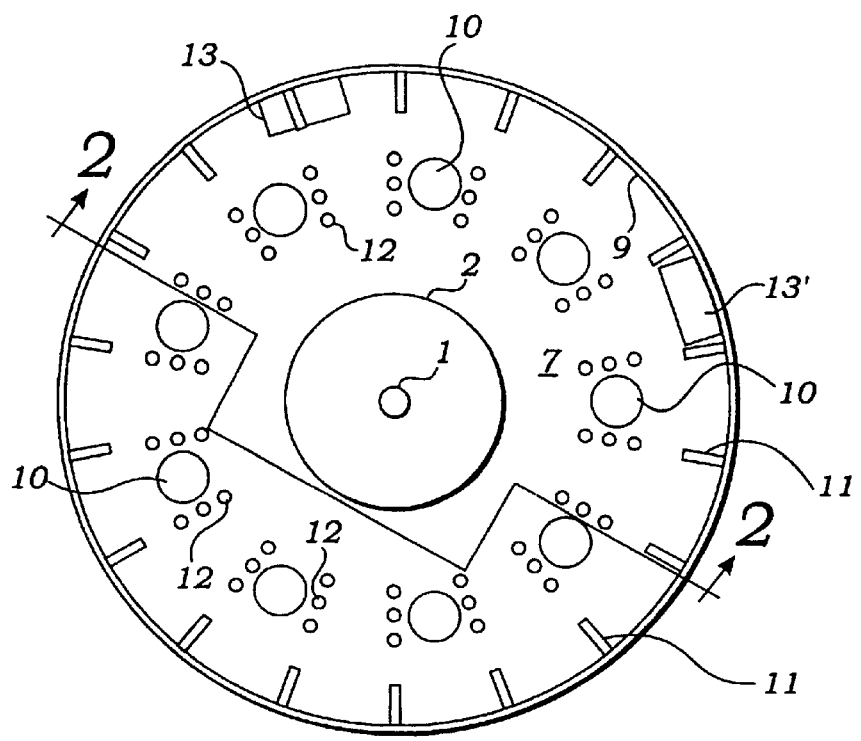
FIG. 1 is a top plan view of the preferred embodiment of the apparatus within which the invention method is performed, and is shown with ceiling removed for viewing the interior of a mixing tank of the invention apparatus.
Figure 2:
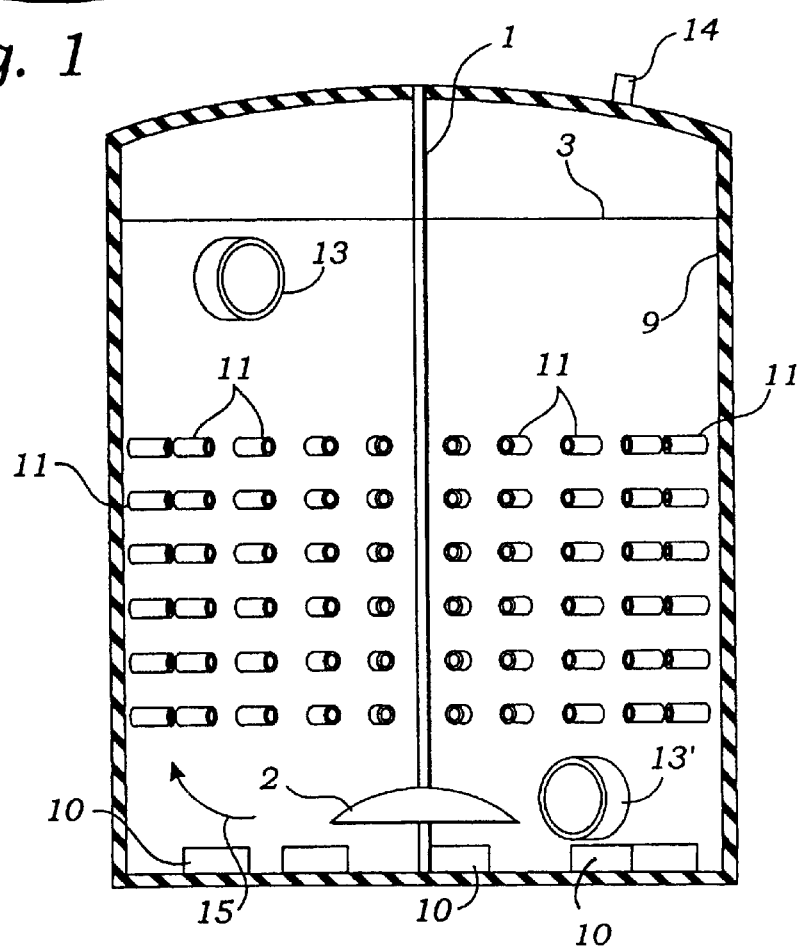
FIG. 2 is a side elevational section view thereof.

The almost astonishing improvements in waste processing, as defined in the above summary of this invention, have been carefully recorded in controlled, scaled experimental tests. It is believed that if processing of waste matter in sewage plants were in accordance with this description, a cost saving of up to 80% of current process methods would be realized. The apparatus of this invention method, as shown in FIGS. 1 and 2, comprises a mixing tank, typically constructed of concrete or steel, and enabled, as will be shown, for improving digestion rates in a sludge medium. The apparatus comprises: the mixing tank which provides an integral ceiling 8, an interior wall surface 9 and a floor surface 7. A vertical beam 1 is engaged with and extends upwardly from the floor surface 7. A mixing means 2, such as a paddle, is engaged for movement along the vertical beam 1 and is enabled for moving from the bottom of the tank to the top of the tank and then back to the bottom in cyclic motion. A plurality of sparger jets 11 protrudes from the wall surface 9 for delivering gas flow into the mixing tank. In FIG. 1 it is seen that these jets protrude into the medium only slightly, but such protrusion may be as extensive as necessary to achieve the purpose of high intimate contact between gas and sludge. The plurality of sparger jets 11 terminates at the floor surface 7 for delivering gas flow into the mixing tank. A plurality of bubbling diffusers 10 protrude upwardly from the floor surface 7 for delivering further gas flow into the mixing tank. In all cases, the gas delivered into the tank is pure oxygen. Depending on the interior pressure reached within the tank, a gas relief valve 14 is placed for allowing pressure release as necessary.

In that the tank of this invention may be a pressure tank, it is preferably made with circular in shape, i.e., in cross section, as shown in FIG. 1 and the sparger jets 11 are directed radially inwardly. It has been discovered that with the sparger jets covering at least 70% of the mixer wall surface 9 surprising results occur in that the digestion process is accelerated by up to 40 times. The bubbling diffusers 10 are arranged in a circular pattern with a diameter equal to approximately ⅔ of the diameter of the mixing tank. This also has been found to be a critical parameter to the improved speed and therefore volume of medium that can be handled by the digester. The combination of a circular paddle 2 moving downwardly forces currents in the medium to move radially in the direction shown by arrow 15 in FIG. 2, and thus into the stream of the circular pattern of bubbling diffusers. This arrangement has been determined to be critical to the speed and overall efficiency of the method of the invention, which will be discussed below.

The present invention is a method for improving digestion rates in the instant sludge digester, which comprises filling the mixing tank through inlet 13 with an undigested sludge (not shown) and mixing the sludge with a mechanical mixer 1, 2 whose operation is well defined in the art. Oxygen gas is forced, under pressure, through the plurality of sparger jets protruding from a wall surface 9 of the mixing tank into the interior of the sludge. Bubbling oxygen gas under pressure into the tank from a plurality of bubbling diffusers 10 located in a floor 7 of the mixing tank provides further oxygen gas impingement with the sludge. The improved mixing and a high dissolved oxygen content; between four and forty-five parts per million provides support to enable a larger population density of aerobic bacteria for greatly improved sludge processing efficacy and rate, in digester tanks. Such a range of oxygen content is critical to the process wherein, a content less than four parts per million is ineffectual, and a content of greater than forty-five ppm does not appear to provide improvement, i.e., the process is already maximized. When the digestion process is complete, the mixing tank is drained through drain 13'. However, it has been found that the process, with 4–45 ppm, is so efficient that it may be used in a continuous manner with a small amount of the medium moving into the tank near the fill line 3 and draining from the mixing tank continuously as the sludge is being processed through the drain 13'. It is believed that the reason for such vast improvements in sludge reduction and sewage throughput in the present method is that the high oxygen content provides for massive improvements in bacteria populations and results directly in the acceleration of process throughput. Until now, the conventional wisdom has held that oxygen content cannot be driven above that of the solubility in water. However, we have found that the mere presence of oxygen in all forms, including in the dissolved state as well as mechanically bound, and the delivery of such to the interior of the sludge mass provides extremely unsuspected results to those of us of skill in this art.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A method for improving digestion rates in a sludge digester which comprises: filling a mixing tank with an undigested sludge; mixing the sludge with a mechanical mixer; forcing oxygen gas under pressure through a plurality of sparger jets protruding from a wall surface of the mixing tank into the interior of the sludge, said jets covering at least 70% of the wall surface; bubbling oxygen gas under pressure from a plurality of bubbling diffusers, located in a floor of the mixing tank in a circle approximately ⅔ of the diameter of the mixing tank, into the sludge; and draining the mixing tank when the sludge has been digested as a batch process.

2. A method for improving digestion rates in a sludge digester which comprises: filling a mixing tank with an undigested sludge; mixing the sludge with a mechanical mixer; forcing oxygen gas under pressure through a plurality of sparger jets protruding from a wall surface of the mixing tank into the interior of the sludge, said jets covering at least 70% of the wall surface; bubbling oxygen gas under pressure from a plurality of bubbling diffusers, located in a floor of the mixing tank in a circle approximately ⅔ of the diameter of the mixing tank, into the sludge; and draining processed sludge and introducing new sludge into the mixing tank continuously as a continuous process.

3. A method for improving digestion rates in a sludge digester which comprises: filling a mixing tank with an undigested sludge; mixing the sludge with a mechanical mixer; forcing oxygen gas under pressure through a plurality of sparger jets protruding from a wall surface of the mixing tank into the interior of the sludge, said jets covering at least 70% of the wall surface; bubbling oxygen gas under pressure from a plurality of bubbling diffusers; thereby causing a free and dissolved oxygen content within the undigested sludge to be between four and forty five parts per million; and draining the mixing tank when the sludge has been digested as a batch process.

4. A method for improving digestion rates in a sludge digester which comprises: filling a mixing tank with an undigested sludge; mixing the sludge with a mechanical mixer; forcing oxygen gas under pressure through a plurality of sparger jets protruding from a wall surface of the mixing tank into the interior of the sludge, said jets covering at least 70% of the wall surface; bubbling oxygen gas under pressure from a plurality of bubbling diffusers, thereby causing a free and dissolved oxygen content within the undigested sludge to be between four and forty five parts per million; and draining processed sludge and introducing new sludge into the mixing tank continuously as a continuous process.

* * * * *